Sept. 1, 1959 O. G. NORTH 2,902,289
AUXILIARY ROAD-WHEEL ASSEMBLY FOR AUTOMOTIVE TRUCKS
Filed Aug. 20, 1956 3 Sheets-Sheet 3
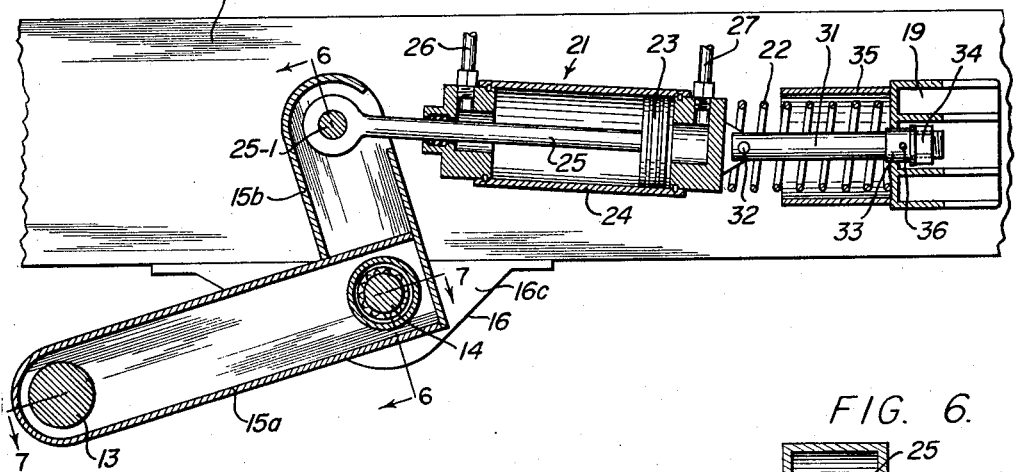
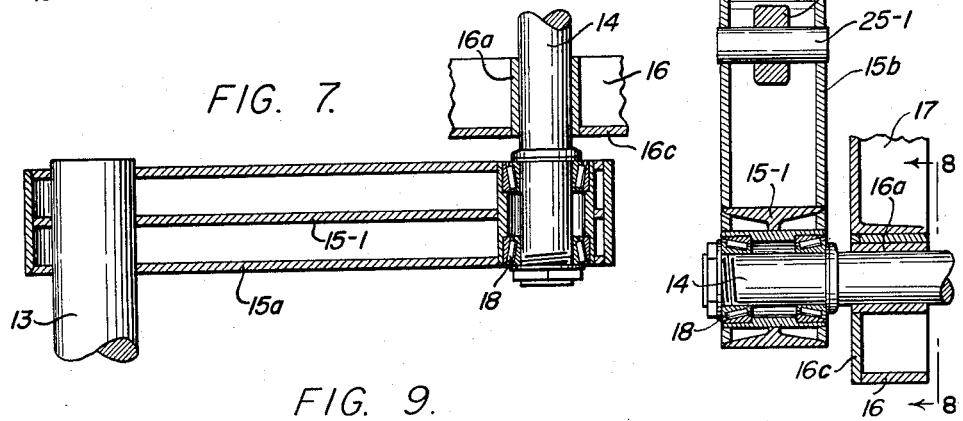
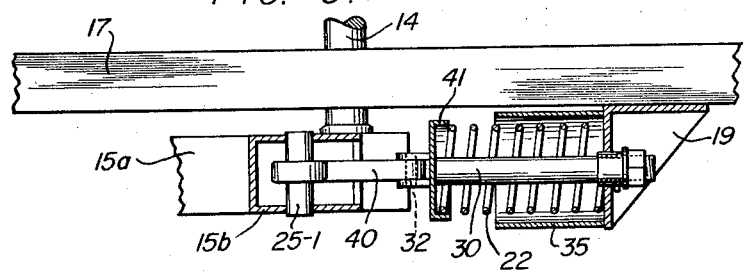
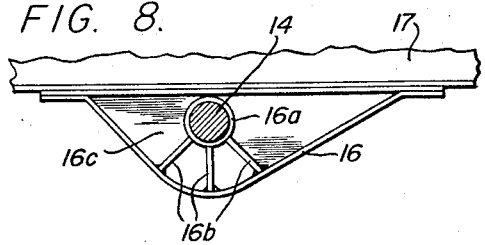
INVENTOR.
ORLIN G. NORTH
BY
ATTORNEYS

United States Patent Office 2,902,289
Patented Sept. 1, 1959

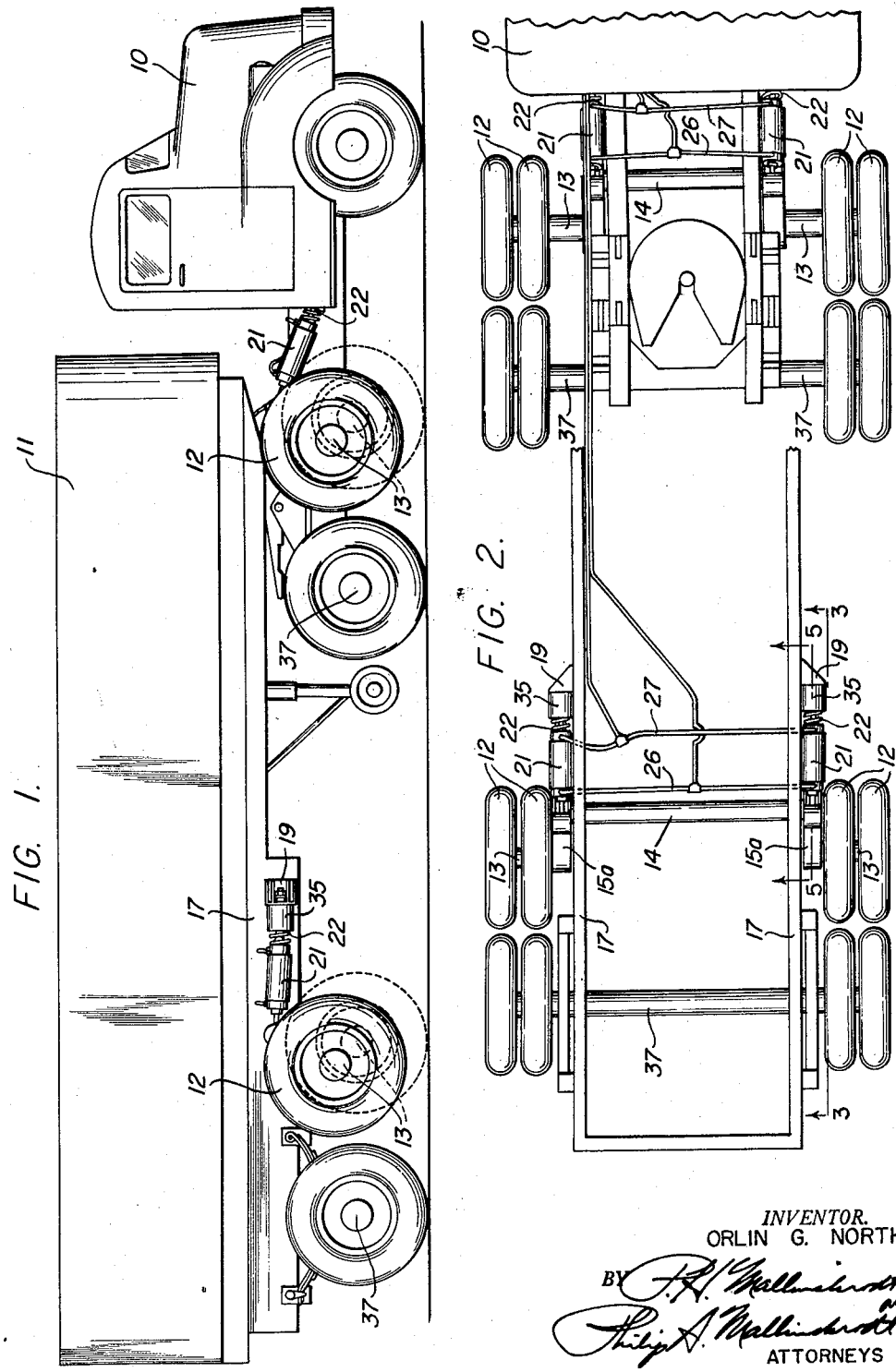

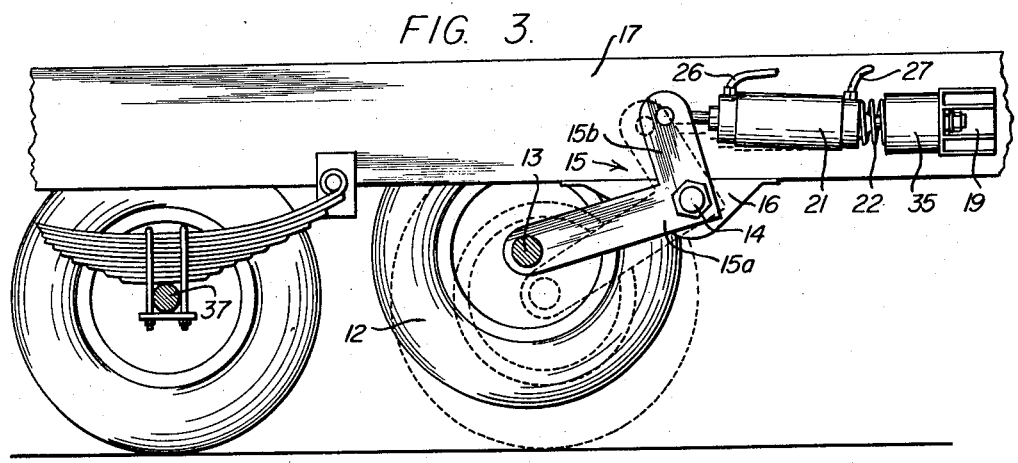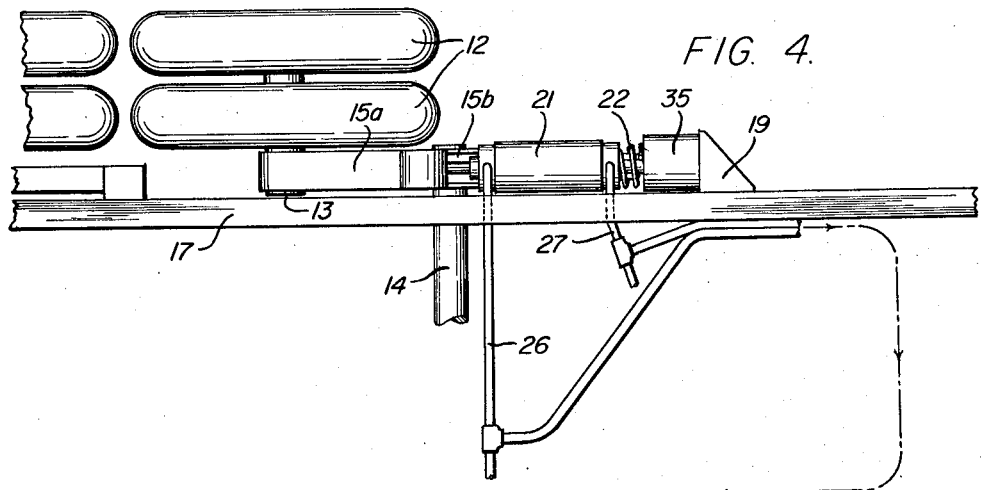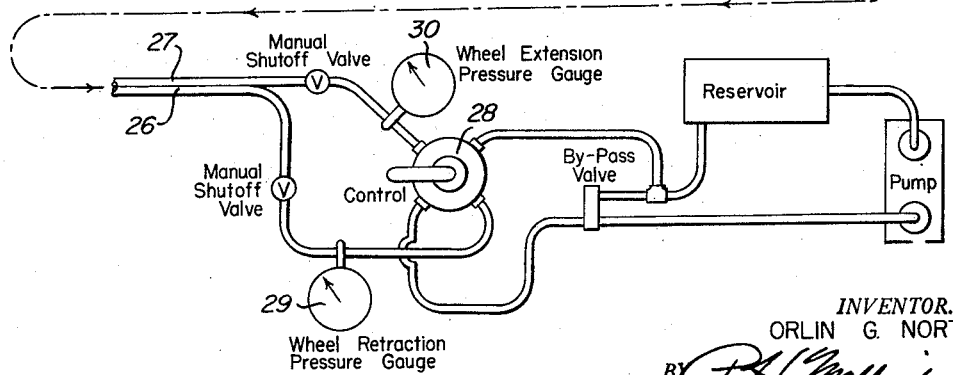

2,902,289

AUXILIARY ROAD-WHEEL ASSEMBLY FOR AUTOMOTIVE TRUCKS

Orlin G. North, Salt Lake City, Utah

Application August 20, 1956, Serial No. 605,080

5 Claims. (Cl. 280—81)

This invention relates to undercarriage components for automotive vehicles, particularly heavy duty transport trucks of various types. It is concerned with road-wheel assemblies, especially those of retractable type, for auxiliary use in accommodating greater than normal loads.

Broadly speaking, the use of auxiliary sets of retractable wheels as an optional load-carrying part of the undercarriage of a transport truck is not new. Yet, little use has been made of such equipment as heretofore developed. Such equipment has been disadvantageous for general use for a variety of reasons. In some instances, equipment has been too complicated or too expensive; in others, it has not been sufficiently versatile to permit its application to the many different kinds of transport trucks presently in use. Another disadvantage has been the fact that spring suspension for such equipment has either been non-existent or inadequate; again, operative controls have not been satisfactory.

Despite the above difficulties, there has been a continued demand for equipment that will relieve the normally provided axles of overloads. This can be readily appreciated when it is realized than an overloaded transport vehicle is often subjected to severe legal penalties and to unloading of the excess portion of its load at some inconvenient place.

The present invention has for its principal object the provision of a relatively inexpensive and easily installed auxiliary set of road wheels that supply an additional axle for any ordinary heavy duty truck, enabling it to haul greater than normal loads without exceeding the legal limit, such set of road wheels embodying its own spring suspension.

Another object is to make the auxiliary road wheels easily retractable under positive control from the cab of the vehicle.

An outstanding feature of the invention resides in the simple and effective manner in which suspension springing is provided, without interfering with retraction.

Further objects and features of the invention will become apparent from the following detailed description of the presently preferred embodiments illustrated by way of example in the accompanying drawings.

In the drawings:

Fig. 1 represents a side elevation of a conventional tractor-trailer transport truck equipped with two sets of the retractable road wheels of the invention;

Fig. 2, a top plan view of the chassis and undercarriage of both tractor and trailer, the front wheels and portions of the cab of the tractor unit being broken away for convenience of illustration;

Fig. 3, a fragmentary vertical section taken on the line 3—3 of Fig. 1, revealing the device of the invention in side elevation, the view being drawn to an enlarged scale and alternative positions being indicated by dotted lines;

Fig. 4, a fragmentary top plan corresponding to a portion of Fig. 2, the same being drawn to the scale of Fig. 3 and and including a diagrammatic representation of a satisfactory type of fluid-control system for retracting and extending the auxiliary wheels;

Fig. 5, a fragmentary vertical section taken on the line 5—5 of Fig. 2 and drawn to a considerably enlarged scale;

Fig. 6, a fragmentary vertical section taken on the line 6—6 of Fig. 5 and drawn to a still larger scale;

Fig. 7, a fragmentary horizontal section taken on the line 7—7 of Fig. 5 and drawn to the same scale as Fig. 6;

Fig. 8, a fragmentary vertical section taken on the line 8—8 of Fig. 6 showing one of the attachment brackets in rear elevation, this view being drawn to a somewhat reduced scale; and Fig. 9, a fragmentary horizontal section taken axially through the spring components of a somewhat different embodiment of the invention wherein springing but no retractability is provided for the auxiliary wheels.

Referring to the drawings:

As applied to the tractor-trailer transport truck of Figs. 1–4, which comprises a tractor unit 10 and a load-carrying trailer unit 11, the auxiliary, retractable assembly of the invention includes, in both its application to the tractor 10 and its application to the trailer 11, sets of dual wheels 12 at respectively opposite sides of the unit concerned, each set having its opposite pairs of wheels mounted on respective stub axles 13 projecting in off-set relationship from opposite ends of a main axle 14 by means of bell crank lever arms 15a, Fig. 3. The latter here constitute the long arms of respective bell cranks 15, whose short arms 15b advantageously but not necessarily extend in right-angular relationship with the long lever arms 15a, respectively, as shown. The main axles 14 rotatively mount the respective sets of bell cranks 15 at the junctions of the two arms of the latter.

In the construction illustrated, the lever arms 15a are longer than the lever arms 15b. While this does make for compactness, it is not necessarily so arranged. In fact, a greater mechanical advantage would be had by a reverse arrangement. Nevertheless, under the circumstances, no real disadvantage is encountered by reason of the fact that the work arms of the bell cranks are longer than the power arms thereof.

The auxiliary road-wheel assembly of the invention may be built into any truck at the factory as original equipment, but it is more likely that such assembly will be marketed primarily as accessory equipment.

While the attachment mounting may vary as between the two instances noted above, it is preferable in either event that a pair of attachment brackets 16 be rigidly secured to the lower faces of the respective longitudinal frame members 17 of the chassis, for example by welding. As here shown, see particularly Fig. 8, such attachment brackets 16 are fabricated of structural steel by welding, each including a rigidly fixed bearing 16a which rotatably receives the axle 14, and structural reinforcing struts 16b. A face plate 16c closes the outer side of the bracket, both for the sake of structural strength and appearance.

Each bell crank 15 is also preferably of welded steel construction as indicated, see particularly Figs. 6 and 7, including an I-beam 15–1 as the backbone of arm 15a. The stub axles 13 pass through the structural components of the respective arms 15a and are welded rigidly into position. Each bell crank 15 is journaled on axle 14 by means of an antifriction bearing 18.

As so positioned, the bell cranks extend transversely of the longitudinal axis of the axle 14, so that rotational movement thereof about the axis raises and lowers bell crank arms 15a relative to the road. The road wheels 12 are rotatably mounted in conventional fashion on the stub axles 13, and are raised and lowered along with the bell crank arms 15a.

The other arms 15b of the respective bell cranks serve both as actuators in the retraction and extension of the auxiliary road wheels and as road shock transmitting members relative to the springing. For this purpose, reaction means in the form of protruding brackets 19 are rigidly secured to respective longitudinal frame members 17 of the truck or trailer chassis, as by welding.

Interposed between the free end of the bell crank arm 15b and the reaction bracket 19 of each set of same in the present embodiment of the invention is a fluid-powered actuator 21 and shock absorbing spring 22.

The fluid-powered actuator 21 may be of conventional construction and powered hydraulically or pneumatically. As illustrated, it is hydraulically powered and comprises a piston 23 working in a cylinder 24. Piston 23 is pivotally connected to the free end of bell crank arm 15b by means of a connecting rod 25 journaled on a pin 25–1 rigid with such bell crank arm. Oil or other hydraulic fluid is supplied to and removed from cylinder 24 at respectively opposite sides of piston 23 by means of flow lines 26 and 27 which are part of a control system illustrated diagrammatically in Fig. 4.

In most installations, such control system will be nothing more than the customary hydraulic system modified somewhat to serve the purposes of the present invention along with those for which it is usually provided. It is made up of standard items, i.e. fluid reservoir, pump, bypass valve (all indicated as such), and a manually actuated control valve 28, located in the cab of the truck. In addition, pressure gauges 29 and 30 are provided to indicate wheel retraction pressure and wheel extension pressure, respectively.

In most instances it is preferable to interpose manual shut-off valves, as indicated, Fig. 4, in the flow lines 26 and 27.

Springs 22 are advantageously of the coil type, as illustrated, each being interposed between a cylinder 24 and a corresponding reaction bracket 19, see especially Fig. 5. The cylinder is supported by means of a guide rod 31, which is articulatively connected at one of its ends to such cylinder as by means of a pivot pin 32, and is slidable within a bushing 33 at its other end. Bushing 33 is fixed in bracket 19. The free end of guide rod 31 is threaded, and a nut 34 is screwed thereon to secure the assembled parts in position and to adjust the extent of retraction. A sleeve 35 extending rigidly from bracket 19 protects spring 22 from inadvertent displacement. Bushing 33 is lubricated by means of a grease fitting 36.

In use, the truck may be operated either with the wheels extended or retracted. If extended, the pressure with which they are made to contact the road is controlled by properly setting the control valve 28 of the hydraulic system and is indicated by the pressure gauge 30. By controlling this pressure, it is possible to proportion the load between the standard axles 37 of the truck (here tractor and trailer units 10 and 11, respectively) and the auxiliary axles 14, as desired.

Retraction is accomplished by appropriate actuation of control valve 28, the pressure in the system under such circumstances being indicated by the gauge 29.

In instances where there is no need for retracting the auxiliary set of road wheels once installed, the fluid-actuated power unit 21 may be eliminated, as indicated in Fig. 9. In that embodiment of the invention, a connecting rod 40 replaces the piston connecting rod 25 of the previous embodiment. It is articulatively connected to the guide rod 31 by means of pivot pin 32 in the same way that cylinder 24 of the previous embodiment is connected to such guide rod. A reaction piece 41 rigidly attached to guide rod 31 takes the place of cylinder 24 in providing abutment for the spring 22. Otherwise, this embodiment is identical with that first described.

Whereas this invention is here illustrated and described with respect to presently preferred embodiments thereof, it is to be understood that various changes may be made within the scope of the following claims, without departing from the essential teachings hereof.

I claim:

1. An auxiliary, retractable, road-wheel assembly for automotive trucks, comprising an auxiliary axle; a pair of bell cranks correspondingly mounted on said axle at respectively opposite ends and transversely of the longitudinal axis thereof and intermediate the bell crank arms, so that movement of such bell cranks about said axis of the axle raises and lowers a set of mutually corresponding bell crank arms relative to the road; road wheels rotatively mounted, respectively, on the free ends of the bell crank arms of said set; respective reaction means spaced apart from the free ends of the other bell crank arms; power means in the form of respective fluid-actuated piston and cylinder assemblies interposed between said other bell crank arms and said reaction means and operative upon the former to move them backwardly and forwardly for pushing the auxiliary road wheels against the road and for retracting said road wheels, each of these assemblies including a cylinder, a piston operable in said cylinder, and a piston rod extending from one end of the cylinder and pivotally connected to the free end of the corresponding one of said other bell cranks; a guide rod pivotally connected to the other end of the cylinder and extending slidably through the reaction means, said guide rod having its free end threaded; a coiled compression spring encircling said guide rod and bearing against said other end of the cylinder and said reaction means for absorbing road shocks and for transmitting the weight carried by said auxiliary axle to said reaction means, an adjustment nut threaded on the free end of said guide rod and bearing against said reaction means in opposition to said spring; and a fluid supply and control system for said piston and cylinder assemblies, so that said road wheels may retracted and extended at will.

2. The auxiliary road-wheel assembly of claim 1, wherein the axle is fixedly secured to truck-attachment brackets, and the bell cranks are rotatably mounted on opposite ends of said axle.

3. The auxiliary road-wheel assembly of claim 1, wherein the reaction means is a bracket adapted for fastening to the chassis of an automotive truck.

4. The auxiliary road-wheel assembly of claim 3, wherein a sleeve extends from said bracket and protectively surrounds at least a part of the length of the coil spring.

5. In combination with an automotive truck equipped with a normal type of undercarriage including road wheels and axle and spring suspensions for said road wheels, an auxiliary road-wheel assembly independent of said undercarriage and adapted to be optionally retracted into raised inoperative position free and clear of the road, said assembly comprising an auxiliary axle spaced apart from the normal axle; a pair of bell cranks correspondingly mounted on said auxiliary axle at respectively opposite ends and transversely of the longitudinal axis thereof and intermediate the bell crank arms, so that movement of such bell cranks about said axis of the axle raises and lowers a set of mutually corresponding bell crank arms relative to the road; road wheels rotatively mounted, respectively, on the free ends of the bell crank arms of said set; respective reaction means spaced apart from the free ends of the other bell crank arms in a direction opposite to said set of bell crank arms and remote from the normal axle; spring means operative between said free ends of the other bell crank arms and said reaction means, for absorbing road shocks and for transmitting the weight carried by said auxiliary axle to said reaction means, said spring means being wholly independent of and spaced apart from said spring suspensions of the normal undercarriage; and power means interposed between said free ends of the other bell crank arms and said spring means, for rotating said bell cranks in one or the other direction about the axis of said auxiliary axle as a center to raise said auxiliary road wheels free and clear of the road or to urge them into road-engaging and load-supporting position in which said spring means constitutes the spring suspension for said auxiliary wheels.

References Cited in the file of this patent

UNITED STATES PATENTS

| | | |
|---|---|---|
| 1,547,923 | Johnson | July 28, 1925 |
| 2,698,758 | Ronning | Jan. 4, 1955 |
| 2,762,631 | Entz | Sept. 11, 1956 |
| 2,777,529 | Harbers | Jan. 15, 1957 |
| 2,792,235 | Federspiel | May 14, 1957 |

FOREIGN PATENTS

| | | |
|---|---|---|
| 467,309 | Germany | Oct. 23, 1928 |